(12) United States Patent
Cheng et al.

(10) Patent No.: US 9,228,069 B2
(45) Date of Patent: Jan. 5, 2016

(54) SUB-10-NANOMETER NANOSTRUCTURES ENGINEERED FROM GIANT SURFACTANTS

(71) Applicants: Stephen Z. D. Cheng, Richfield, OH (US); Wenbin Zhang, Akron, OH (US); Kan Yue, Akron, OH (US); Xinfei Yu, Akron, OH (US); I-Fan Hsieh, Akron, OH (US)

(72) Inventors: Stephen Z. D. Cheng, Richfield, OH (US); Wenbin Zhang, Akron, OH (US); Kan Yue, Akron, OH (US); Xinfei Yu, Akron, OH (US); I-Fan Hsieh, Akron, OH (US)

(73) Assignee: The University of Akron, Akron, OH (US)

( * ) Notice: Subject to any disclaimer, the term of this patent is extended or adjusted under 35 U.S.C. 154(b) by 16 days.

(21) Appl. No.: 14/268,016

(22) Filed: May 2, 2014

(65) Prior Publication Data
US 2015/0315348 A1    Nov. 5, 2015

(51) Int. Cl.
*C03C 25/68* (2006.01)
*C08J 7/02* (2006.01)
*C09D 183/10* (2006.01)

(52) U.S. Cl.
CPC ............... *C08J 7/02* (2013.01); *C09D 183/10* (2013.01); *C08J 2383/10* (2013.01)

(58) Field of Classification Search
CPC ........ C08J 7/02; C08J 2383/10; C09D 183/10
USPC .................................................. 216/55, 41
See application file for complete search history.

(56) References Cited

U.S. PATENT DOCUMENTS

2007/0134420 A1* 6/2007 Koberstein .............. A61L 27/34
427/258

OTHER PUBLICATIONS

Zhang, et al.; Synthesis of Shape Amphiphiles Based on Functional Polyhedral Oligomeric Silsesquioxane End-Capped Poly(L-Lactide) with Diverse Head Surface Chemistry, 2011, Macromolecules: vol. 44, pp. 2589-2596.
Dong, et al.; Synthesis of fullerene-containing poly(ethylene oxide)-block-polystyrene as model shape amphiphiles with variable composition, diverse architecture, and high fullerene functionality, 2011, Polymer Chemistry: vol. 3, pp. 124-134.
Yu, et al.; Giant Molecular Shape Amphiphiles Based on Polystyrene-Hydrophilic [60]Fullerene Conjugates: Click Synthesis, Solution Self-Assembly, and Phase Behavior, 2012, Journal of the American Chemical Society: 134, 7780-7787.
Wang, et al.; Giant gemini surfactants based on polystyrene-hydrophilic polyhedral oligomeric silsesquioxane shape amphiphiles: sequential "click" chemistry and solution self-assembly, 2013, Chem. Sci, 4, pp. 1345-1352.
Li, et al.; Synthesis of Shape Amphiphiles Based on POSS Tethered with Two Symmetric/Asymmetric Polymer Tails via Sequential "Grafting-from" and Thiol-Ene "Click" Chemistry, 2012, ACS Macro Letters : vol. 1, pp. 834-839.

(Continued)

*Primary Examiner* — Roberts Culbert
(74) *Attorney, Agent, or Firm* — Renner Kenner Greive Bobak Taylor & Weber

(57) ABSTRACT

A process of forming a nanopatterned substrate is provided. The process comprising the steps of first preparing a giant surfactant comprising a cage-like molecular nanoparticle head linked to a polymer chain tail through a chemical linkage. Next, using the giant surfactant, a thin film is formed. Next the thin film formed from the giant surfactant is annealed such that the giant surfactant self-assembles into a desired nanostructure. The desired nanostructure is comprised of periodic major domains and minor domains. Finally, at least some of either the major domain or the minor domain is selectively removed to form the nanopatterned substrate.

13 Claims, 5 Drawing Sheets

(56) References Cited

OTHER PUBLICATIONS

Yue, et al.; Sequential "Click" Approach to Polyhedral Oligomeric Silsesquioxane-Based Shape Amphiphiles, 2012, Macromolecules: vol. 45, pp. 8126-8134.

Yue, et al.; Anionic Synthesis of a "Clickable" Middle-Chain Azide Functionalized Polystyrene and Its Application in Shape Amphiphiles, 2013, Chinese Journal of Polymer Science vol. 31, No. 1, pp. 71-82.

* cited by examiner

SUB-10-NANOMETER NANOSTRUCTURES ENGINEERED FROM GIANT SURFACTANTS

FIELD OF THE INVENTION

Generally, the present invention relates to self-assembling small-molecule surfactants. In particular, the present invention relates to versatile nanostructures that, in some embodiments, can achieve sub-10-nm feature sizes. More particularly, the present invention relates to a unique class of self-assembling "giant surfactants" that bridge the gap between small molecule amphiphiles and amphiphilic block copolymers and possesses the advantages of both materials, thus providing a unique platform for engineering versatile nanostructures.

BACKGROUND OF THE INVENTION

Physical properties of materials are dictated by the hierarchical arrangements of atoms, molecules, and supramolecular assemblies across different length scales. The construction and engineering of structures at each length scale, especially at the 2- to 100-nm scale, are critically important in achieving desired macroscopic properties. As the traditional top-down lithography techniques face serious challenges in fabricating 2D and 3D nanostructured materials with sub-20-nm feature sizes, the bottom-up approach based on self-organization or directed assembly of functional molecules provides a promising alternative. The past decades have witnessed the development of diverse self-assembly building blocks ranging from small-molecule surfactants, block copolymers, and dendrimers to DNAs, peptides, and proteins. Notably, these motifs have enabled the programmed self-assembly of nanomaterials as demonstrated in DNA-coated nanoparticles. These studies have greatly improved the understanding of thermodynamics and kinetics of self-assembly processes and have opened enormous possibilities in modern nanotechnology.

Noncovalent interactions, such as hydrogen bonding, amphiphilic effect, $\pi$-$\pi$ interaction, metal coordination bonding, and electrostatic forces are known to be the fundamentals to precise self-assembly. Specific recognition and binding events, such as DNA hybridization and protein folding, are based on collective and cooperative multiple secondary interactions. More recently, anisotropy in shape has also been recognized as a critical factor in the self-assembly process due to packing constraints, as indicated by the emerging concept of "shape amphiphiles". However, it remains challenging to design nanomaterials "from scratch" that can generate diverse structures at a specific length scale, e.g., the nanostructures with feature sizes around 100 nm or smaller and even heretofore never produced sizes of 10 nm or smaller, as in the case of some embodiment of the invention herein.

Small-molecule surfactants have been a classic type of self-assembling materials and are typically composed of polar ionic heads and flexible hydrophobic tails. Although a variety of nanostructured assemblies can be created, they usually lack the required etching contrast between the hydrophobic and hydrophilic domains. The well-established microphase separation of block copolymers has, on the other hand, led to the development of the block copolymer lithography, affording access to nanopatterning with high patterning density at low processing costs. Substantial progress has been demonstrated to guide the nanostructure formation in the block copolymer thin films at a 20- to 100-nm feature size scale. Pushing the feature sizes to an even smaller scale has had limited success. It is difficult to achieve a strong segregation with a sharp interface at sub-20-nm length scale, because the chemical incompatibility in typical block copolymers is reflected by the product of the interaction parameters and the degree of polymerization. It is even more challenging to generate unconventional patterns, such as rectangular lattices, due to their thermodynamic metastability. Micro-phase separation of block copolymer materials has been well documented. The ability of bock copolymers to generate various ordered patterns in the bulk and thin film states serves as the basis for the development of alternative nanopatterning technologies to complement the traditional "top-down" photolithographic processes, especially in creating small feature sizes (below 100 nm) at large area.

In the present invention size amplification and structural diversification of self-assembling small-molecule surfactants, is seen as an effective strategy for the molecular design of a unique class of self-assembling "giant surfactants". This class of giant surfactants bridges the gap between small molecule amphiphiles and amphiphilic block copolymers and possesses advantages of both materials, thus providing a unique platform for engineering versatile nanostructures that, in some embodiments, can achieve sub-10-nm feature sizes, though the present invention is not limited thereto.

SUMMARY OF THE INVENTION

Herein, giant surfactants are taught as analogues of the aforementioned block copolymers. When introducing proper functional groups to the MNP-heads and selection of composition of the polymer tails, giant surfactants can similarly micro-phase separate into various ordered structures. Compared to traditional block copolymers, the strikingly distinct characteristics of giant surfactants materials are reflected in the following aspects: 1. Chemical structures of MNP heads are well defined and their sizes are typically around several nanometers. As a result, the self-assembled domains of the MNPs can be reduced to sub-5-nm scales. Achieving sub-5-nm domain feature sizes in self-assembly of block copolymers is still regarded as a challenge due to the requirement of extremely larger interaction parameters between the polymer blocks. 2. Precisely defined chemical structures of MNPs indicate monodispersed sizes, which might help reduce the overall structural heterogeneity caused by polydispersity of polymer materials and thus reduce defect density in self-assembled structures. 3. Specifically, silica-based MNPs such as POSS are hybrid in nature. Incorporation of silicon-oxygen backbone will increase etching contrast with most organic polymer materials, therefore facilitating the pattern transfer processes.

A first embodiment of this invention provides a process of forming a nanopatterned substrate comprising the steps of: preparing a giant surfactant comprising a cage-like molecular nanoparticle head linked to a polymer chain tail through a chemical linkage, forming a thin film from said giant surfactant; annealing said film such that said giant surfactant self-assembles into a desired nanostructure comprising periodic major domains and minor domains; and selectively removing at least some of either said major domains or said minor domains.

A second embodiment of this invention provides a process as in the first embodiment, wherein the cage-like molecular nanoparticle head is selected from the group consisting of polyhedral silsesquioxanes, polyhedral polyoxometalates, and/or fullerenes.

A third embodiment of this invention provides a process as in either the first or second embodiments, wherein the polymer chain tail is selected from the group consisting of polystyrene, polymethacrylates, polyacrylates, polyethyleneoxide, polyisoprene, polybutadiene, polyolefins, polyesters, polyvinylpyridine, and fluorinated polymers.

A fourth embodiment of this invention provides a process as in either the first through third embodiments, wherein the polymer chain tail has a molecular weight of from 100 to 100,000 Daltons.

A fifth embodiment of this invention provides a process as in either the first through fourth embodiments, wherein the chemical linkage linking the cage-like molecular nanoparticle head and the polymer chain tail is selected from the group consisting of azide/alkyne linkages, cycloaddition linkages, esterification linkages, and/or thio-ether linkages.

A sixth embodiment of this invention provides a process as in either the first through fifth embodiments, wherein the major and minor domains have a periodicity of sub-100 nm size.

A seventh embodiment of this invention provides a process as in either the first through sixth embodiments, wherein the thin film is formed by spin casting, drop casting or spray casting a solution of the giant surfactant and a solvent onto a substrate.

A eighth embodiment of this invention provides a process as in either the first through seventh embodiments, wherein the solvent is selected from the group consisting of toluene, tetrahydrofuran (THF), and dimethylformamide (DMF).

A ninth embodiment of this invention provides a process as in either the first through eighth embodiments, wherein the substrate is selected from silicon wafers, carbon-coated silicon wafers, micas, metals, and indium tin oxide glasses.

A tenth embodiment of this invention provides a process as in either the first through ninth embodiments, wherein the volume fraction of polymer chain tail to cage-like molecular nanoparticle head is selected such that nanostructure of said step of annealing a lamellae micellar morphology.

A eleventh embodiment of this invention provides a process as in either the first through tenth embodiments, wherein the volume fraction of polymer chain tail to cage-like molecular nanoparticle head is selected such that nanostructure of said step of annealing a bicontinuous double gyroid micellar morphology.

A twelfth embodiment of this invention provides a process as in either the first through eleventh embodiments, wherein the volume fraction of polymer chain tail to cage-like molecular nanoparticle head is selected such that nanostructure of said step of annealing a hexagonal packed cylinders micellar morphology.

A thirteenth embodiment of this invention provides a process as in either the first through twelfth embodiments, wherein the volume fraction of polymer chain tail to cage-like molecular nanoparticle head is selected such that nanostructure of said step of annealing a body center cubic packed spheres micellar morphology.

A fourteenth embodiment of this invention provides a combination substrate and mask layer comprising: a substrate, and a mask layer formed of a giant surfactant comprising a cage-like molecular nanoparticle head linked to a polymer chain tail through a chemical linkage, the mask layer formed into a nanostructure comprising periodic major domains and minor domains.

A fifteenth embodiment of this invention provides a combination substrate and mask layer as in the fourteenth embodiment, wherein the cage-like molecular nanoparticle head is selected from the group consisting of polyhedral silsesquioxanes, polyhedral polyoxometalates, and/or fullerenes.

A sixteenth embodiment of this invention provides a combination substrate and mask layer as in either the fourteenth and fifteenth embodiments, wherein the polymer chain tail is selected from the group consisting of polystyrene, polymethacrylates, polyacrylates, polyethyleneoxide, polyisoprene, polybutadiene, polyolefins, polyesters, polyvinylpyridine, and fluorinated polymers.

A seventeenth embodiment of this invention provides a combination substrate and mask layer as in the fourteenth through sixteenth embodiments, wherein the polymer chain tail has a molecular weight of from 100 to 100,000 Daltons.

A eighteenth embodiment of this invention provides a combination substrate and mask layer as in the fourteenth through seventeenth embodiments, wherein the chemical linkage linking the cage-like molecular nanoparticle head and the polymer chain tail is selected from the group consisting of azide/alkyne linkages, cycloaddition linkages, esterification linkages, and/or thio-ether linkages.

A nineteenth embodiment of this invention provides a combination substrate and mask layer as in the fourteenth through eighteenth embodiments, wherein the major and minor domains have a periodicity of sub-100 nm size.

A twentieth embodiment of this invention provides a combination substrate and mask layer as in the fourteenth through nineteenth embodiments, wherein the substrate is selected from silicon wafers, carbon-coated silicon wafers, micas, metals, and indium tin oxide glasses.

A twenty-first embodiment of this invention provides a combination substrate and mask layer as in the fourteenth through twentieth embodiments, wherein the volume fraction of polymer chain tail to cage-like molecular nanoparticle head is selected such that the nanostructure formed has a lamellae micellar morphology.

A twenty-second embodiment of this invention provides a combination substrate and mask layer as in the fourteenth through twenty-first embodiments, wherein the volume fraction of polymer chain tail to cage-like molecular nanoparticle head is selected such that the nanostructure formed has a bicontinuous double gyroid micellar morphology.

A twenty-third embodiment of this invention provides a combination substrate and mask layer as in the fourteenth through twenty-second embodiments, wherein the volume fraction of polymer chain tail to cage-like molecular nanoparticle head is selected such that the nanostructure formed has a hexagonal packed cylinders micellar morphology.

A twenty-fourth embodiment of this invention provides a combination substrate and mask layer as in the fourteenth through twenty-third embodiments, wherein the volume fraction of polymer chain tail to cage-like molecular nanoparticle head is selected such that the nanostructure formed has a body center cubic packed spheres micellar morphology.

DETAILED DESCRIPTION OF ILLUSTRATIVE EMBODIMENTS

The present invention provides giant surfactants for use in providing thin films with multidimensional nanopatterns. These thin films are provided on substrates for use as nanolithographic masks as well as templates for the synthesis of inorganic or organic substrates. The giant surfactants include a cage-like molecular head (or molecular nanoparticle (MNP) head), provided by a three dimensional cage-like molecule, and a polymer chain tail linked to the three dimensional cage-like molecule. In various embodiments, different numbers of heads and polymer chains are linked to form specific giant surfactants. These giant surfactants are functionalized to assemble into nanopatterns upon being formed into thin films and annealed. Nanopatterns include lamellae, bicontinuous double gyroids, hexagonal packed cylinders, and body center cubic packed spheres. The patterns can be selectively etched to provide a final desired patterned substrate. For example, the thin film could be provided on a silicon wafer substrate to provide a nanopattern for etching the silicon wafer for use as a data storage medium.

Based on developed building blocks of MNPs and polymer tails, giant surfactants can be classified into different categories. They include, but are not limited to the following described embodiments. Generally speaking, giant surfactants can be divided according to the number of MNP heads and polymer tails, as well as the chemical compositional differences. The nomenclature is similar to the small molecule surfactant systems but differ in many aspects, too. For example, the simplest giant surfactants contain one MNP as the head and one polymer chain as the tail. If two MNPs and two polymer chains are tethered together, a Gemini giant surfactant can be created. By the term "giant lipids" it is meant that one MNP is tethered with two polymer tails of identical or different compositions.

"Patchy" features can be introduced to giant surfactants if the MNP heads or polymer tails have compositional complexity, for example, when the MNP is a Janus molecular particle having two different functional groups.

Multiple-headed giant surfactants have more than one MNP as the heads that can be identical or different. The number of polymer tails can be one or more. It should be noted that the classification is not exclusive. One particular giant surfactant structure can be classified into different categories based on different structural features under consideration. Similarly, multiple-tailed giant surfactants refer to those having more than one polymer tail. Giant lipid can be viewed as one particular kind of multi-tailed giant surfactant, too.

Hybrid giant surfactants refer to multiple-headed or multiple-tailed giant surfactants composed of different MNPs or polymer tails. In the following sections, cartoon illustrations will be described to further introduce the structural features of giant surfactants.

Figure 1:
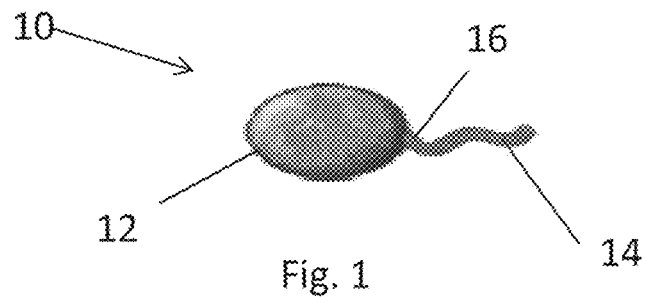
FIG. 1 shows a cartoon illustration of one of the embodiments of giant surfactants in accordance with this invention having a cage-like molecule head and a polymer chain linked thereto at a linkage.
Figure 2:
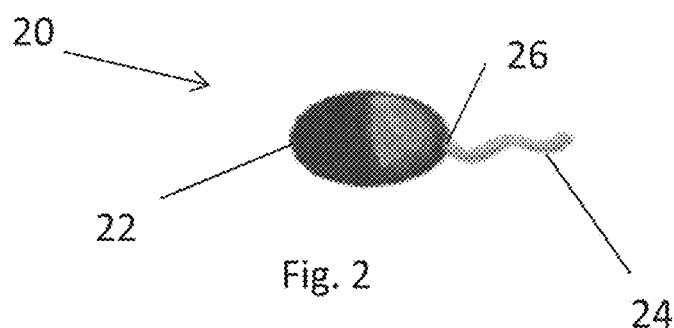
FIG. 2 shows a cartoon illustration of another of the embodiments of giant surfactants in accordance with this invention having a patchy cage-like molecule head and a polymer chain linked thereto at a linkage.
Figure 3:
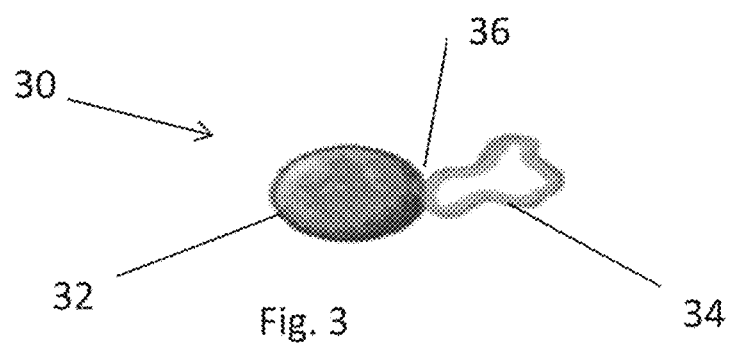
FIG. 3 shows a cartoon illustration of yet another of the embodiments of giant surfactants in accordance with this invention having a cage-like molecule head and a cyclic polymer chain linked thereto at a linkage.
Figure 4:
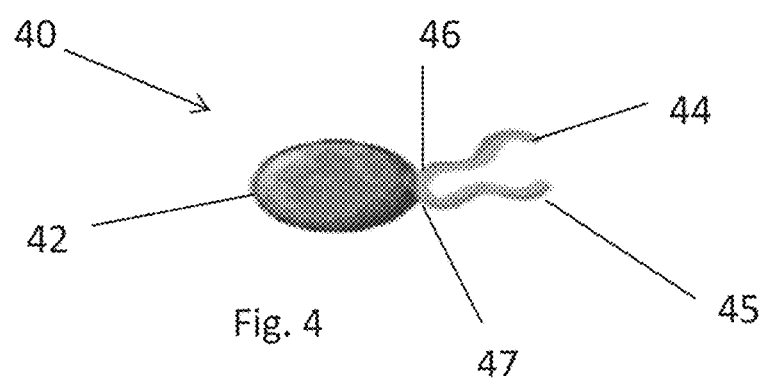
FIG. 4 shows a cartoon illustration of yet another of the embodiments of giant surfactants in accordance with this invention having a cage-like molecule head and two polymer chains linked to the cage-like molecule head at two linkages.
Figure 5:
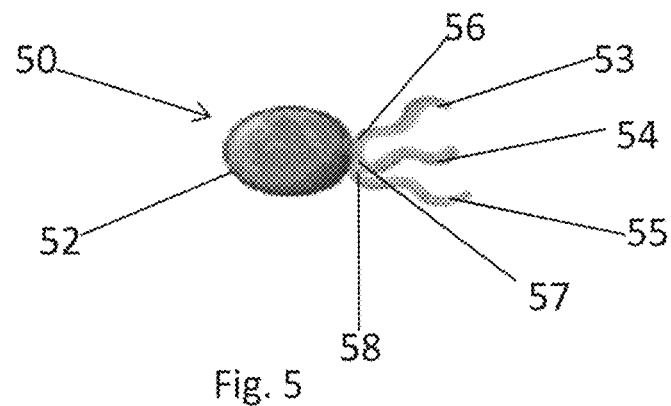
FIG. 5 shows a cartoon illustration of yet another of the embodiments of giant surfactants in accordance with this invention having a cage-like molecule head and multiple polymer chains linked to the cage-like molecule head at multiple linkages.

FIGS. 1-10 provide cartoon illustrations of various exemplary embodiments of giant surfactants in accordance with this invention. This exemplary listing is to be understood as enlightening as to the possibilities of this invention and is not be interpreted as limiting the invention. FIG. 1 provides a basic form of a giant surfactant. This giant surfactant 10 includes a cage-like molecule (or MNP) head 12 and a polymer chain 14 linked thereto at a linkage schematically represented at 16. In FIG. 2, a giant surfactant 20 includes a patchy cage-like molecular head 22 and a polymer chain 24 linked thereto at a linkage schematically represented at 26. As indicated above, by "patchy" it is meant that the cage-like molecular head includes multiple functionalities. In FIG. 3, a giant surfactant 30 includes a cage-like molecular head 32 and a cyclic polymer chain 34 linked thereto at a linkage schematically represented at 36. That is, the tail extends from and links back to the molecular head. This may be referred to as a necklace-type tail. In FIG. 4, a giant surfactant 40 includes a cage-like molecular head 42 and two polymer chains 44 and 45 linked thereto at a linkage schematically represented at 46 and 47 (which can also be termed as a giant lipid as described above). In FIG. 5, a giant surfactant 50 includes a cage-like molecular head 52 and multiple polymer chains 53, 54, and 55 linked thereto at a linkage schematically represented at 56, 57, and 58 (which can also be termed as a multiple-tailed giant surfactant as described above).

Figure 6:
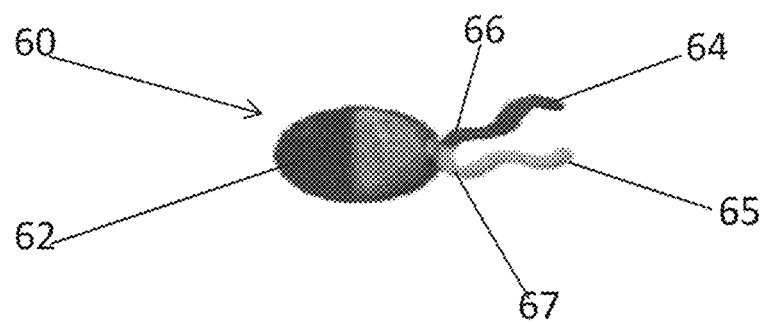
FIG. 6 shows a cartoon illustration of yet another of the embodiments of giant surfactants in accordance with this invention having a patchy cage-like molecule head and two different species of polymer chains linked to the cage-like molecule head at two linkages.
Figure 7:
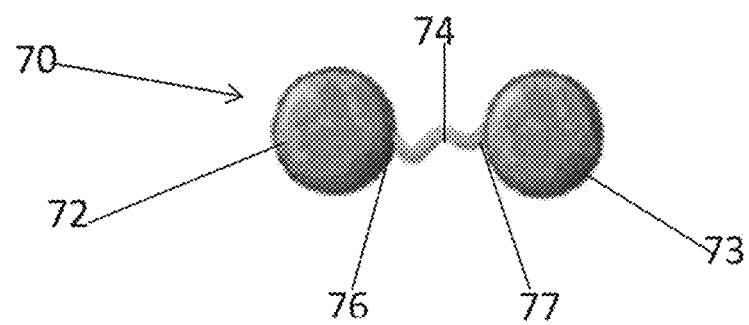
FIG. 7 shows a cartoon illustration of yet another of the embodiments of giant surfactants in accordance with this invention having two cage-like molecule heads and a polymer chain linking the two cage-like molecule heads at two linkages to form a bola-form giant surfactant.
Figure 8:
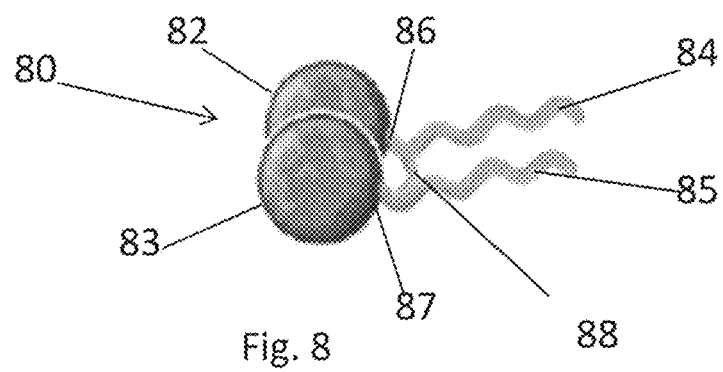
FIG. 8 shows a cartoon illustration of yet another of the embodiments of giant surfactants in accordance with this invention having two cage-like molecule heads each having a polymer chain which is linked to the cage-like molecule heads at two linkages to form a Gemini form giant surfactant having a link 88 extending between the two polymer chains.
Figure 9:
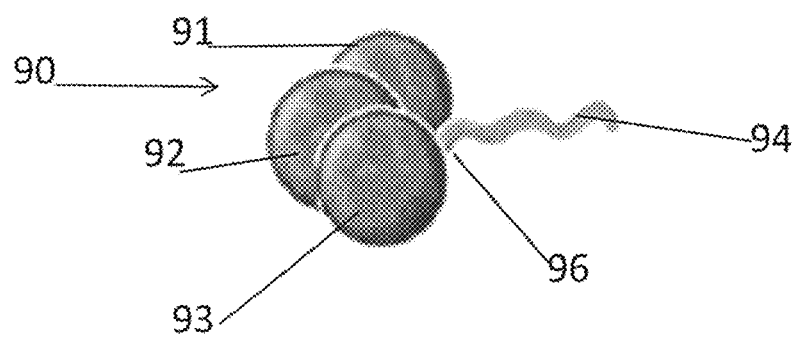
FIG. 9 shows a cartoon illustration of yet another of the embodiments of giant surfactants in accordance with this invention having multiple cage-like molecule heads of the same species and a polymer chain linked thereto at a linkage.
Figure 10:
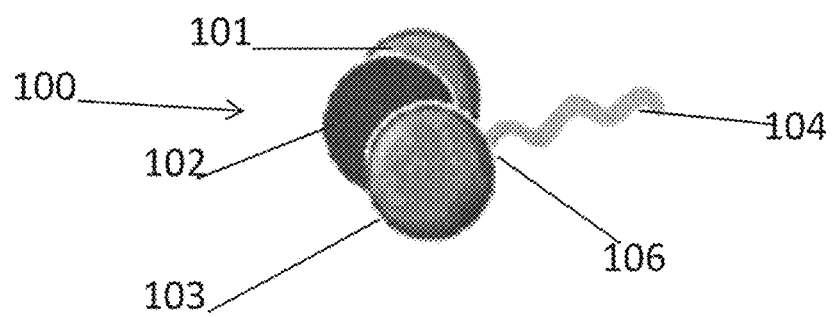
FIG. 10 shows a cartoon illustration of yet another of the embodiments of giant surfactants in accordance with this invention having multiple cage-like molecule heads of two or more species and a polymer chain linked thereto at a linkage.

In FIG. 6, a giant surfactant 60 includes a patchy (i.e., two functionalities) cage-like molecular head 62 and two different species of polymer chains 64 and 65 linked thereto at a linkage schematically represented at 66 and 67. In FIG. 7, a giant surfactant 70 includes two cage-like molecular heads 72 and 73 linked by a polymer chain 74 to provide what is termed herein a bola-form giant surfactant. The heads 72, 73 are linked at linkages 76 and 77. In FIG. 8, a giant surfactant 80 includes two cage-like molecular heads 82 and 83 each with a polymer chain 84 and 85, respectively, linked thereto at linkages represented at 86 and 87, respectively. This giant surfactant is of the Gemini form, having a link 88 extending between the two polymer chains 84, 85. These heads 82, 83 may be the same or different, as may be the polymer chains 84, 85. In FIG. 9, a giant surfactant 90 includes multiple cage-like molecular heads of the same species 91, 92, and 93 and a polymer chain 94 linked thereto at a linkage schematically represented at 96. In FIG. 10, a giant surfactant 100 includes multiple cage-like molecular heads of two or more different species 101, 102, and 103 and a polymer chain 104 linked thereto at a linkage schematically represented at 106.

The cage-like molecular heads are molecular polyhedrons. In particular embodiments, they are chosen from silica-based or carbon-based molecular polyhedrons. The molecular polyhedrons are three-dimensional atom clusters bearing rigid structural scaffolds and well-defined sizes on the nanometer scale. The cage-like molecular heads bear homo- or hetero-functionalities for achieving desired phase separation ability relative to the polymer chain tails when in bulk or cast in thin films. They are exemplified by, but not limited to, polyhedral oligomeric silsesquioxane (POSS), polyoxometalates (POMs), and fullerenes. Depending on surface functionalization, these cage-like molecular heads may vary in composition, size, shape, and symmetry and carry diverse functions. In some embodiments, the cage-like head is selected from POSS derivatives, POMS derivatives and fullerene derivatives. The term "derivative" connotes any molecular structures derived from or based on the essential core structures with different functionalization groups on the cage-like molecular head.

Polyhedral oligomeric silsesquioxanes, also known as POSS, are a family of molecules with different numbers of silicon and oxygen atoms and are unique in that they are physically large (approx. 1.5 nm in diameter and 1000 amu) and are composed of robust silicon-oxygen framework that can be easily functionalized with a variety of organic substituents. Appropriate functionalization of POSS molecular heads relative to the chosen tails provides self-assembly characteristics whereby bulk mixtures and/or thin films phase separate and self-assembly into nanopatterns.

In some embodiments, the molecular head is chosen from POSS derivatives having a cage structure of 6 or 8 or 10 or 12 Si atoms. In some embodiments, the molecular head is chosen from POSS derivatives having other different numbers of silicon atoms with symmetric or asymmetric spatial arrangements. In some embodiments, the POSS molecular head is a POSS derivative having any suitable functionalization groups for creating a chemical incompatibility with the polymer chain tail so as to facilitate and drive the self-assembly in bulk or thin film. In some embodiments, the POSS molecular head is functionalized with one or more hydrophilic groups, while the tail is hydrophobic. In other embodiments, the POSS molecular head is functionalized with one or more hydrophobic groups, while the tail is hydrophilic. In some embodiments, the hydrophilic groups on the POSS molecular head are selected from hydroxyl groups, carboxylic acid groups, amine groups, amide groups, sulfonic acid groups. In some embodiments, the POSS heads can be functionalized with fluorinated alkyl chains.

POMs (polyoxometalates) are polyatomic ions with a cage-like 3-dimensional framework. They consist of three or more transition metal oxyanions linked together by shared oxygen atoms to form a large, closed 3-dimensional framework (cage-like structure). They are formed by early transition metals at their high oxidation state and some heteroatoms. The exterior of the cage-like structure includes terminal oxygen atoms that can be substituted with desired functional groups, as already described in relation to POSS above. The functionalization together with the ionic nature of POMs serves to ensure a phase separation relative to the giant surfactant tail as already disclosed above.

In some embodiments, the molecular head is chosen from POMS having a cage structure formed of group 5 or group 6 transition metal atoms and oxygen atoms. In some embodiments, the POM molecular head is a POM derivative having any suitable functionalization for creating an incompatibility with the polymer chain tail so as to facilitate and drive the self-assembly in bulk or thin film. In some embodiments, the POM molecular head is functionalized with one or more functional inorganic cationic ions, while the tail is hydrophobic. In some embodiments, the POM molecular head is functionalized with one or more functional organic cationic ions, while the tail is hydrophobic.

In some embodiments, the molecular head is a fullerene derivative. In some embodiments, the fullerene is in the spherical shape. In some embodiments, the fullerene is selected from C60, C70, C72, C76, C84, C100 and other fullerenes. The chemistry for functionalizing the exterior of fullerene is well developed, and the fullerene can be functionalized with desired functional groups, as already described in relation to POSS above. The functionalization serves to ensure a phase separation relative to the giant surfactant tail as already disclosed above.

In some embodiments, the fullerene molecular head is a fullerene derivative having any suitable functionalization for creating an incompatibility with the polymer chain tail so as to facilitate and drive the self-assembly in bulk or thin film. In some embodiments, the fullerene molecular head is functionalized with one or more hydrophilic groups, while the tail is hydrophobic. In other embodiments, the fullerene molecular head is functionalized with one or more hydrophobic groups, while the tail is hydrophilic. In some embodiments, the hydrophilic groups on the fullerene molecular head are selected from hydroxyl groups, carboxylic acid groups, amine groups, amide groups, sulfonic acid groups and fluorinated alkyl chains.

The polymer chain can be virtually any polymer suitable for thin film formation. The polymer chain may be, for example, polystyrene, polymethacrylates, polyacrylates, polyethyleneoxide, polyisoprene, polybutadiene, polyolefins, polyesters, polyvinylpyridine, fluorinated polymers, or other similar types of polymers.

In some embodiments, the polymer chain has a molecular weight of from 100 to 100,000 Daltons. In other embodiments, the polymer chain has a molecular weight of from 500 to 20,000 Daltons, in other embodiments, from 500 to 5000 Daltons, in other embodiments, from 1000 to 5000 Daltons. In some embodiments, the polymer chain has a size of less than 100 nanometers (nm), in other embodiments, less than 50 nm, in other embodiments, less than 20 nm, and in other embodiments, less than 10 nm.

In some embodiments, the polymer chain is hydrophilic, while the molecular head is hydrophobic. In some embodiments, the polymer chain is hydrophobic, while the molecular head is hydrophilic. In some embodiments, the polymer chain is either hydrophobic or hydrophilic, while the MNP head is fluorinated. In some other embodiments, the MNP head is either hydrophobic or hydrophilic, while the polymer tail is fluorinated.

Joining the head(s) and tail(s) through a chemical linkage forms the giant surfactants. For example, in looking at FIG. 1, the cage-like molecule head 12 and the polymer chain 14 are linked together at a linkage schematically represented at 16. If there are multiple multiple tails, such as in FIGS. 4, 5, 6 and 8 (and, conceptually FIG. 3), each tail could be linked to the head through its own individual linkage or the tails could be linked together and then joined to the head by a single linkage. Examples are provided below. Similarly, if there are multiple heads, such as in FIGS. 8 and 9, each head could be linked to a tail through its own individual linkage or the heads could be linked together and then joined to the tail by a single linkage. In a different embodiment, a multi-armed tail could be linked to a head though a singular linkage. The linkages can be formed by various known chemistries for joining molecules through reactive groups. In some embodiments, the heads and tails are joined through chemical linkages selected from the group consisting of cycloaddition linkages, azide/alkyne linkages, esterification linkages, and thioether linkages.

A cycloaddition is a pericyclic chemical reaction, in which two or more unsaturated molecules (or parts of the same molecule) combine with the formation of a cyclic adduct in which there is a net reduction of the bond multiplicity. The resulting reaction is a cyclization reaction. Many but not all cycloaddition reactions are concerted. As a class of addition reaction, cycloaddition reactions permit carbon-carbon bond formation without the use a nucleophile or electrophile. In some embodiments, one or more molecular heads and one or more polymer chain tails are appropriately functionalized for connection through a cycloaddition reaction. In some embodiments, the one or more molecular heads bear diene functionality while the one or more polymer chains bear dienophile functionality, and they are joined through the formation of a six-member-ring linkage to form a giant surfactant. In some embodiments, the one or more molecular heads bear diene functionality bearing electron donating groups or electron withdrawing groups while the one or more polymer chains bear dienophile functionality bearing electron donating groups or electron withdrawing groups, and they are joined through the formation of a six-member-ring linkage with functional groups to form a giant surfactant. In other embodiments, the formed six-member-ring linkage contains one or more heteroatoms to form a giant surfactant.

An azide/alkyne linking reaction is a 1,3-dipolar cycloaddition between an azide and a terminal or internal alkyne to give a 1,2,3-triazole linkage with or without the existence of a proper catalyst. This reaction between azides and alkynes offers high yields and involves functionalities that can be introduced relatively easily in a variety of molecules. In some embodiments, one or more molecular heads and one or more polymer chain tails are appropriately functionalized for connection through the azide/alkyne cycloaddition reaction. In some embodiments, the one or more molecular heads bear azide functionality while the one or more polymer chains bear alkyne functionality, and they are joined through azide/alkyne cycloaddition to form a giant surfactant. In some embodiments, the one or more molecular heads bear alkyne functionality while the one or more polymer chains bear azide functionality, and they are joined through azide/alkyne cycloaddition to form a giant surfactant. In some embodiments, the one or more molecular heads bear alkyne functionality while the one or more polymer chains bear azide functionality, and they are joined through azide/alkyne cycloaddition to form a giant surfactant with the existence of a catalyst. In some embodiments, the formation of the triazole linkage is catalyzed by a copper catalyst. In some embodiments, the formation of the triazole linkage is promoted by the selection of strain-promoted alkyne derivatives.

An esterification reaction is a chemical reaction between an alcohol and an acid to give an ester linkage with or without the existence of a catalyst or other facilitating reagents. This reaction between an alcohol and an acid offers high yields and involves functionalities that can be introduced relatively easily in a variety of molecules. In some embodiments, one or more molecular heads and one or more polymer chain tails are appropriately functionalized for connection through an esterification reaction. In some embodiments, the one or more molecular heads bear alcohol functionality while the one or more polymer chains bear acid functionality, and they are joined through esterification to form a giant surfactant. In some embodiments, the one or more molecular heads bear acid functionality while the one or more polymer chains bear alcohol functionality, and they are joined through azide/alkyne cycloaddition to form a giant surfactant. In some embodiments, the formation of the esterification linkage is facilitated by the existence of a catalyst. In some embodiments, the formation of the esterification linkage is facilitated by the existence of some other reagents.

A thioether linkage can be generated by various different chemical reactions. For example, the reaction between a thiol group and a terminal alkene or alkyne group with or without other adjacent functional groups, with or without external stimuli such as heating or photo illumination, with or without the existence of a catalyst or other promoting reagents, can generate a thio-ether linkage. In some embodiments, one or more molecular heads and one or more polymer chain tails are appropriately functionalized for connection through a thioether linkage. In some embodiments, the one or more molecular heads bear thiol functionality while the one or more polymer chains bear alkene or alkyne functionality, and they are joined through the formation of a thioether linkage to afford a giant surfactant. In some embodiments, the formation of the thioether linkage is facilitated by the existence of other electron donating or electron withdrawing groups adjacent to the alkene or alkyne groups. In some embodiments, the formation of the thioether linkage is facilitated by the existence of a catalyst. In some embodiments, the formation of the thioether linkage is facilitated by applying external stimuli such as photo illumination.

It should be appreciated that the manner of creation of the giant surfactants herein is not to be limiting to the present invention directed to the use of the giant surfactant in nano-patterned thin films and patterned substrates produced therefrom. The forgoing is provided as examples, and those knowledgeable in the field will know and discover additional ways to create the giant surfactants.

An exemplary structure of a giant surfactant with a single POSS-derivative molecular head and single polystyrene tail is shown below:

Library 1

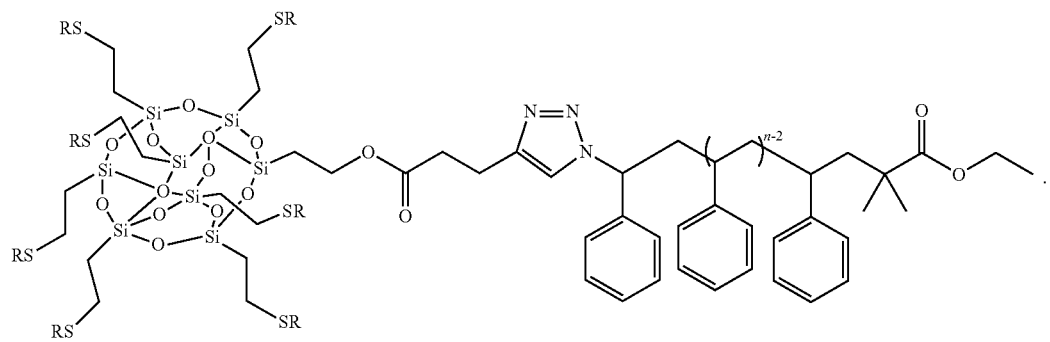

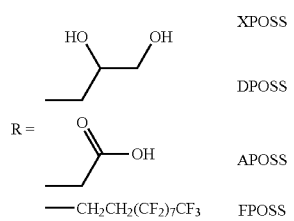

This is an 8 member POSS cage with a polystyrene polymer chain tail bound by a 1,2,3-triazole linkage (azide/alkyne reaction). This giant surfactant is herein named XPOSS-PS$_n$, wherein PS denotes polystyrene and X denotes the functional groups on POSS. In XPOSS-PS$_n$, exemplary functional groups, R, are hydroxyls, carboxylic acids and perfluorinated chains, and, for the nomenclature herein, X becomes D to denote hydroxyls (DPOSS-PS$_n$), becomes A to denote carboxylic acids (APOSS-PS$_n$), and becomes F to denote perfluorinated chains (FPOSS-PS$_n$). The n denotes repeat units of polystyrene chains.

Another exemplary embodiment of a giant surfactant with a POSS molecular head and two polystyrene tails is shown below:

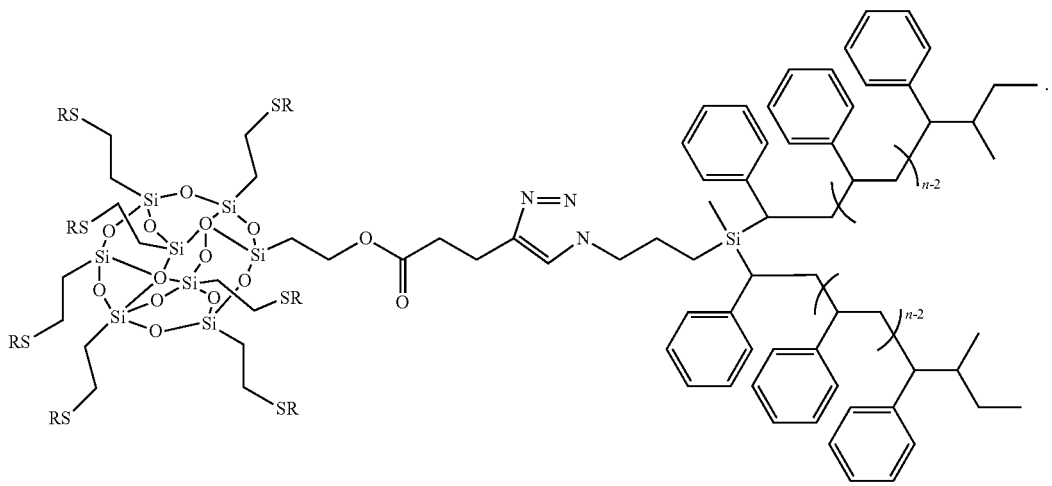

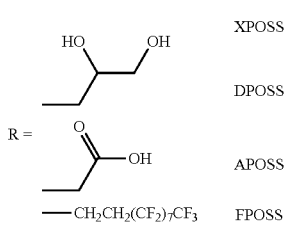

Therein, a multi-armed polystyrene tail is linked to a POSS head though a singular linkage. The giant surfactant has a POSS-derivative molecule head and a polymer chain tail has multiple polystyrene arms linked together and linked to the POSS molecule head through a singular 1,2,3-triazole linkage (azide/alkyne reaction). This giant surfactant is herein named XPOSS-2 PS$_n$, wherein PS denotes polystyrene and X denotes the functional groups on POSS. In XPOSS-2PS$_n$, exemplary functional groups, R, are hydroxyls, carboxylic acids and perfluorinated chains, and, for the nomenclature herein, X becomes D to denote hydroxyls (DPOSS-2PS$_n$), becomes A to denote carboxylic acids (APOSS-2PS$_n$), and becomes F to denote perfluorinated chains (FPOSS-2PS$_n$). The n denotes repeat units of polystyrene chains.

Another exemplary embodiment of a giant surfactant with three POSS molecular heads and a single polystyrene tail is shown below:

Therein, three 8 member POSS cages are bound to a polystyrene polymer chain tail, each through its own 1,2,3-triazole linkage (azide/alkyne reactions). This giant surfactant is herein named 3XPOSS-PS$_n$, wherein PS denotes polystyrene and X denotes the functional groups on POSS. In 3XPOSS-PS$_n$, exemplary functional groups, R, are hydroxyls, carboxylic acids and perfluorinated chains, and, for the nomenclature herein, X becomes D to denote hydroxyls (3DPOSS-PS$_n$), becomes A to denote carboxylic acids (3APOSS-PS$_n$), and becomes F to denote perfluorinated chains (3FPOSS-2PS$_n$). The n denotes repeat units of polystyrene chains.

An exemplary structure of a giant surfactant with a fullerene-derivative molecular head and polystyrene tail is shown below:

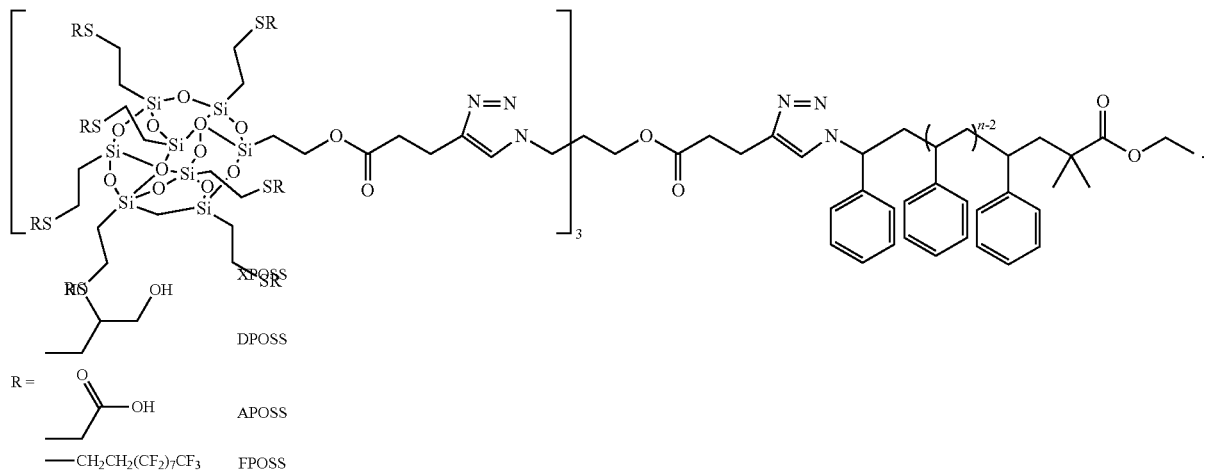

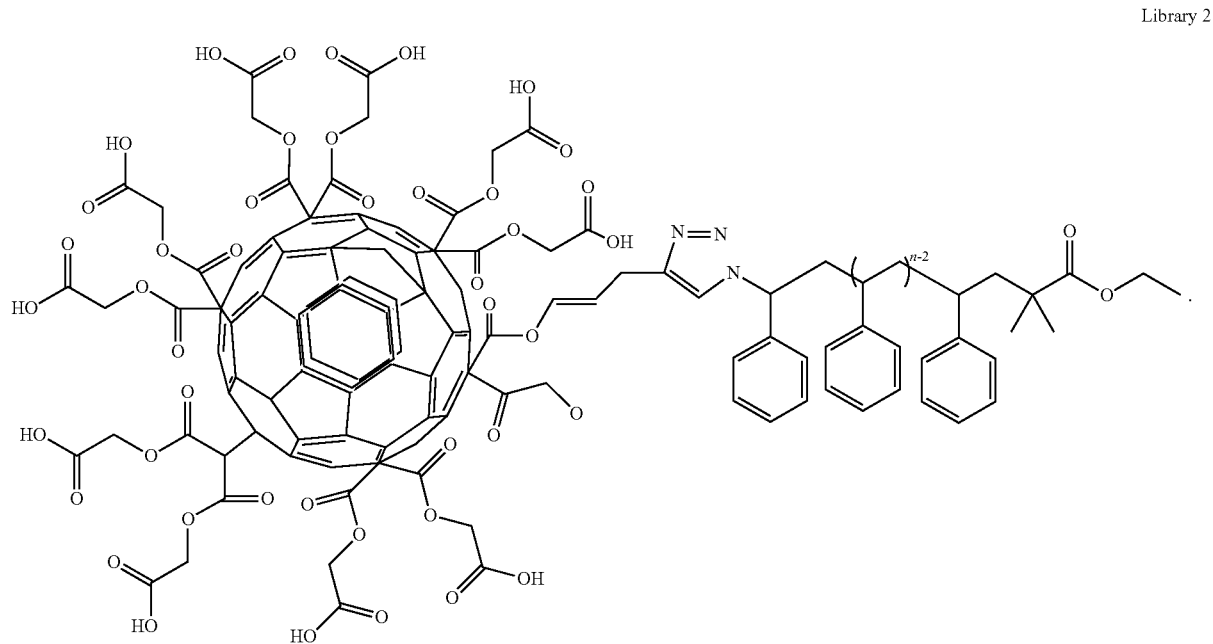

Library 2

A hydrophilic C60 fullerene head functionalized with carboxylic acid groups has a polystyrene polymer chain tail bound by a 1,2,3-triazole linkage. This giant surfactant is herein named $AC_{60}\text{-}PS_n$, where A denotes carboxylic acid functional groups. The n denotes the number of repeat units.

Another exemplary structure of a giant surfactant with a fullerene-derivative molecular head and polystyrene tail is shown below:

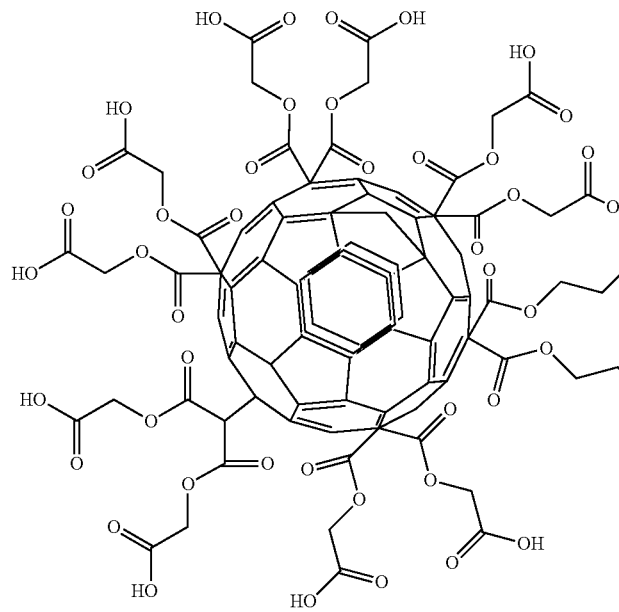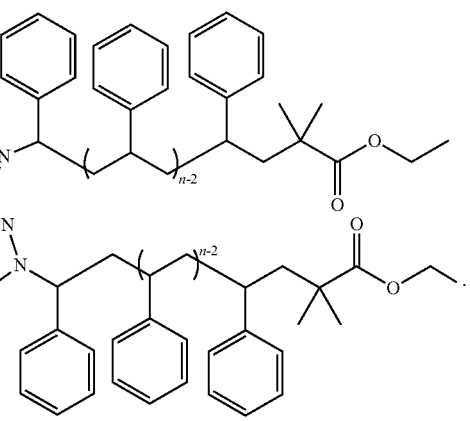

A hydrophilic C60 fullerene head functionalized with carboxylic acid groups has two polystyrene polymer chain tails bound by 1,2,3-triazole linkages. This giant surfactant is herein named $AC_{60}\text{-}2PS_n$, where A denotes carboxylic acid functional groups. The n denotes the number of repeat units.

Many technologies and commercial products rely on the ability to create designed patterns onto desired substrates. To achieve this, selective etching of the substrate to generate patterns is a practical approach. At this state, the feature sizes of the patterns have reached nanometer scales. It remains challenging, however, to reduce the feature sizes down to below 50 nm, or particularly, down to sub-20-nm. To achieve selective etching and patterning of the desired substrate (for example, silicon wafer or ITO glass), a temporary mask layer on the substrate should be created. The mask layer should possess information to induce the formation of the designed patterns. It should provide etching contrast, or to an extreme extend, etching selection towards different etching technologies. In other words, the mask layer should be patterned in advance. Patterning the mask layer can be achieved by different technologies. When referring to block copolymer materials or giant surfactants disclosed herein, patterning of the mask layer is achieved based on the microphase separation ability of these materials. In thin films, the molecules can arrange themselves promoted by various annealing conditions, resulting in the formation of certain patterns, such as lines or dots. As a result, the substrate is covered by a thin film layer formed by the materials with periodic domains. Domains of different compositions will introduce etching contrast under certain etching sources and finally achieve pattern formation of the substrate materials.

To form the thin film a solution of one or more type of giant surfactant is cast to form a film. Casting methods include spin casting, drop casting, spray casting or any other known technologies. The solution is formed to a suitable concentration for the chosen casting method, and common techniques are employed to drive off solvent and establish the film.

For thin film production, the giant surfactants or a mixture of various giant surfactants are cast onto a substrate. In some embodiments, the substrate may be selected from silicon wafers, carbon-coated silicon wafers, mica, metals, ITO glass, and any other related materials.

In some embodiments, the concentration of the solution should be between 0.001 and 50 wt %. The spin rate should be between 200 and 10000 rpm.

The solvent chosen to make the solution can be selected from the group of solvents including toluene, tetrahydrofuran (THF), dimethylformamide (DMF), or any other applicable solvents with proper ability to dissolve the giant surfactants.

The purpose of the casting step based on different process under different operating conditions is to create a thin film layer of the giant surfactants covering the substrate with a desired thickness. Thickness of the thin film ranges from 1 to 500 nm and can be feasibly measured by known techniques, such as AFM and reflectivity.

By controlling different parameters, such as the selection of solvent, the concentration, the coating conditions, the thickness of the thin film can be systematically adjusted.

In most cases, after casting from solution, regular molecular arrangements of the giant surfactants are not spontaneously achieved. Upon removal of the solvent, the molecules could lie in the thin film with any possible orientations. Self-assembly of the giant surfactants in the thin film is induced by an annealing process. The purpose of the annealing process is to provide the necessary mobility to the molecules to allow them to self-organize and form ordered nanostructures, for example, lamellae, bicontinuous double gyroids, hexagonal packed cylinders, and body center cubic packed spheres.

Annealing can be typically achieved by solvent annealing or thermal annealing. In solvent annealing, the thin film on substrate is placed into a chamber with certain vapor concentration of a selected solvent. Upon absorbing the solvent vapor, the molecules in the thin film gain enough mobility to reorganize themselves. Thermal annealing offers even easier experimental setups. The substrate with thin film layer is heated to a desired temperature to provide mobility to the molecules. The pattern formed will be a function of the giant surfactant itself as well as the volume fraction of the molecular heads versus the polymer tail and the processing method. For example, it is know that shearing and other methods can be employed to align block copolymers, and these methods will also work for many giant surfactants.

Due to the functionality on the molecular heads and their relationship to the properties of the tails, the giant surfactants self-assemble with heads gathering to form domains, leaving the tails to also form their own domains. These can be in the lamellae, bicontinuous double gyroids, hexagonal packed cylinders, and body center cubic packed spheres configurations, based on volume fractions, chemical structures of giant surfactants, and techniques employed. A major advancement of the present invention is that this self-assembly can occur even for very small tails. Though the giant surfactants can be used to form nanopattern domains of various sizes, and in some embodiments ranging up to 100 nm or more, it is also noted that they are suitable for creating nanopatterns with feature sizes of less than 10 nm—an achievement heretofore not provided in the prior art of block copolymers and the prior art of small molecule surfactants.

The self-assembled nanostructures within the thin film of the giant surfactants on the substrate could be anisotropic. As a result, there are considerations concerning the orientation of the nanopatterns. For example, the lamellae structures could stand vertically on the substrate or lie down in parallel with the substrate surface. The hexagonal cylinder structures could also stand up on the substrate to give dot patterns in a hexagonal symmetry or lying down in parallel with the substrate to result in line patterns. Control of orientation might be achieved in the annealing process via selection of annealing solvent, and more importantly, via other directed self-assembly techniques, as developed for traditional block copolymers. Directed self-assembly of block copolymers can be achieved by pre-treatment of the substrate surface to introduce chemical or topological confinement.

As described in the above paragraph, orientation of the self-assembled nanostructures is crucial in designing and obtaining different patterns from the thin film and finally transferring the patterns to the substrates. For example, in lamellar forming materials, the orientation of interests is the vertically aligned alternative lamellae. For cylinder forming materials, lying down cylinders and vertically standing-up cylinders could be used to process different patterns on the substrate.

Generally, heads and tails of giant surfactants will be separated in the self-assembled structures. Distribution of the heads and tails within the nanostructures depends on volume fraction of the heads and tails. In lamellae forming materials, the alternative lamellae are composed of heads and tails, respectively. The sizes of the domains are determined by the size of the particles used as the heads and the molecular weight of the polymer tails. In hexagonal and spherical patterns, the cylinders and spheres are minor domains in volume, and are thus composed of the segments of smaller volume fraction. It should be noted that both the nanoparticle heads and polymer tails could serve as the minor domains. Depending on the selection of chemical composition of the nanoparticle heads and molecular weights of the polymer tails, the domain sizes could vary in a range between 1 nm to 200 nm, and therefore the periodicity could vary between 2 to 500 nm.

In some embodiments, an 8 member POSS cage with hydroxyl groups is used as the heads, and the lamellae domains containing POSS cages can have widths as small as sub-5-nm. In some embodiments, an 8 member POSS cage with hydroxyl groups is used as the heads, and the diameters of the cylinders of POSS cages can be as small as 5 nm. In some embodiments, an 8 member POSS cage with hydroxyl groups is used as the heads, and the diameters of the spheres of POSS cages can be as small as 5 nm.

After annealing to create the patterned film, the film is etched to form the desired patterns. Etching serves to remove one of either the molecular head or the polymer tail (or portion thereof). The etching can then be continued to etch the substrate to provide a desired nanopatterned substrate. The etching can follow generally known methods in the art.

EXAMPLES

Thin-film samples were prepared by spin coating the sample solutions in toluene on silicon wafer and carbon-coated silicon wafer or mica. Flat silicon substrates with a 5-nm-thick natural silicon oxide layer were treated with fresh piranha solution at 80° C. for 30 min to form a clean silicon oxide surface, then extensively rinsed with deionized water, and then dried under nitrogen flow. Film thickness was controlled by solution concentration and spin-coating rate. Specifically, for the two samples studied here, the solution concentration was 2.0 wt % and the spin rate was 4,000 rpm. The thin-film thickness is 60.8 nm for DPOSS-PS$_{35}$ and 61.0 nm for APOSS-PS$_{75}$ as determined by spectroscopic ellipsometry. The thin films were further treated by solvent annealing with concentration control wherein the selected solvent was toluene. Solvent treatment was done by using a home-made apparatus that consisted of two nitrogen lines: one goes through a solvent reservoir and another is pure nitrogen. The solvent concentration during the treatment is controlled by varying the flow rates of the pure and solvent-infused nitrogen. Thin-film morphology was then investigated by using TEM and GISAXS. All GISAXS experiments were measured under vacuum. The critical angle of both thin-film samples was determined to be around 0.16°, and the incident angle used for both GISAXS measurements was 0.20°. Thin-film samples for the TEM experiment were prepared by spin coating on carbon coated mica, then immersing the film into water to float it, and then picking it up with a TEM copper gird. Thin-film TEM samples were stained with the vapor of a 4.0-wt % OsO4 aqueous solution for 1 h to enhance the contrast under TEM. Once the films are patterned, they can be selectively etched for the creation of the desired nanopatterned substrate.

Figure 11:
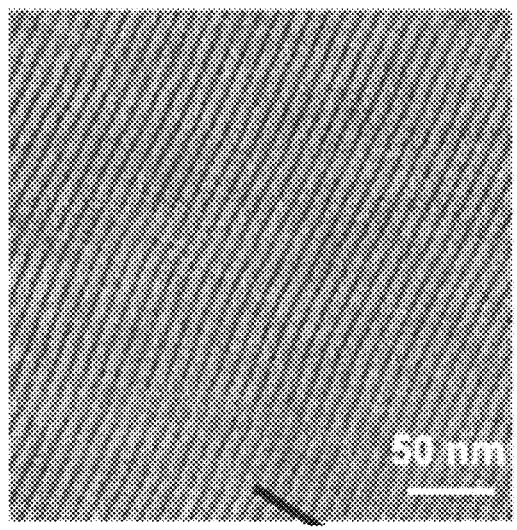
FIG. 11 shows a TEM bright-field mass-thickness-contrast image for a DPOSS-PS$_{23}$ giant surfactant in lamella phase.
Figure 12:
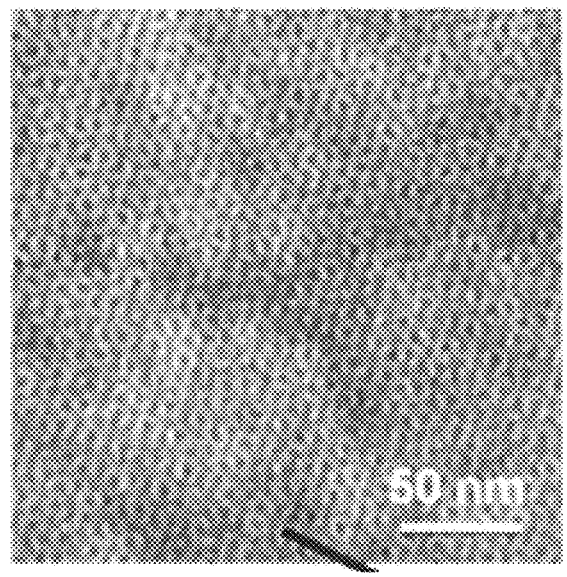
FIG. 12 shows a TEM bright-field mass-thickness-contrast image for a DPOSS-PS$_{35}$ giant surfactant in double-gyroid phase.
Figure 13:
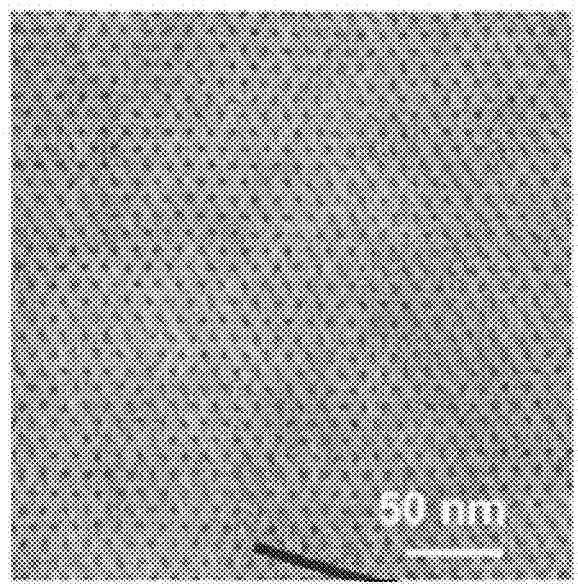
FIG. 13 shows a TEM bright-field mass-thickness-contrast image for a DPOSS-PS$_{91}$ giant surfactant in hexagonally packed cylinder phase.
Figure 14:
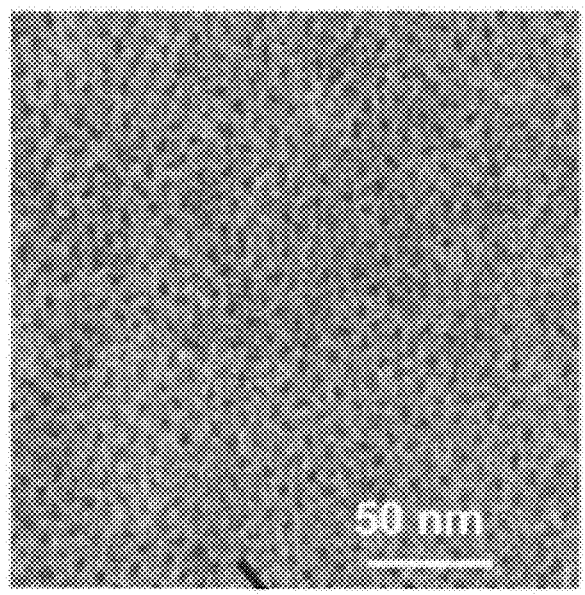
FIG. 14 shows a TEM bright-field mass-thickness-contrast image for a DPOSS-PS$_{140}$ giant surfactant in body-centered cubic sphere phase.

TEM bright-field mass-thickness contrast images of thin film morphologies of DPOSS-PS$_n$ having varying polystyrene chain lengths are shown in FIGS. 11 through 14. With increasing polystyrene tail length, also the volume fraction of the polystyrene, the self-assembled structures change from lamellae, to double gyroids, to hexagonally packed cylinders, and further to body-centered cubic spheres. FIG. 11 shows a DPOSS-PS$_{23}$ giant surfactant in lamella phase. From the experimental data, the lamella phase appears from at least 64 vol % to 76 vol % of polystyrene. FIG. 12 shows a DPOSS-PS$_{35}$ giant surfactant in double-gyroid phase. From the experimental data, the double-gyroid phase exists at around 78 vol % of polystyrene. FIG. 13 shows a DPOSS-PS$_{91}$ giant surfactant in hexagonally packed cylinder phase. From the experimental data, the hexagonally packed cylinder phase appears between 81 vol % and 90 vol % of polystyrene. FIG. 14 shows a DPOSS-PS$_{140}$ giant surfactant in body-centered cubic sphere phase. From the experimental data, the hexagonally packed cylinder phase exists at around 93 vol % of polystyrene.

What is claimed is:

1. A process of forming a nanopatterned substrate comprising the steps of:
   preparing a giant surfactant comprising a cage-like molecular nanoparticle head linked to a polymer chain tail through a chemical linkage,
   forming a thin film from said giant surfactant;
   annealing said film such that said giant surfactant self-assembles into a desired nanostructure comprising periodic major domains and minor domains;
   selectively removing at least some of either said major domains or said minor domains.

2. The process of claim 1, wherein the cage-like molecular nanoparticle head is selected from the group consisting of polyhedral silsesquioxanes, polyhedral polyoxometalates, and/or fullerenes.

3. The process of claim 1 wherein the polymer chain tail is selected from the group consisting of polystyrene, polymethacrylates, polyacrylates, polyethyleneoxide, polyisoprene, polybutadiene, polyolefins, polyesters, polyvinylpyridine, and fluorinated polymers.

4. The process of claim 1 wherein the polymer chain tail has a molecular weight of from 100 to 100,000 Daltons.

5. The process of claim 1, wherein the chemical linkage linking the cage-like molecular nanoparticle head and the polymer chain tail is selected from the group consisting of azide/alkyne linkages, cycloaddition linkages, esterification linkages, and/or thioether linkages.

6. The process of claim 1, wherein the major and minor domains have a periodicity of sub-100 nm size.

7. The process of claim 1, wherein the thin film is formed by spin casting, drop casting or spray casting a solution of the giant surfactant and a solvent onto a substrate.

8. The process of claim 7, wherein the solvent is selected from the group consisting of toluene, tetrahydrofuran (THF), and dimethylformamide (DMF).

9. The process of claim 7, wherein the substrate is selected from silicon wafers, carbon-coated silicon wafers, micas, metals, and indium tin oxide glasses.

10. The process of claim 3, wherein the volume fraction of polymer chain tail to cage-like molecular nanoparticle head is selected such that nanostructure of said step of annealing a lamellae micellar morphology.

11. The process of claim 3, wherein the volume fraction of polymer chain tail to cage-like molecular nanoparticle head is selected such that nanostructure of said step of annealing a bicontinuous double gyroid micellar morphology.

12. The process of claim 3, wherein the volume fraction of polymer chain tail to cage-like molecular nanoparticle head is selected such that nanostructure of said step of annealing a hexagonal packed cylinders micellar morphology.

13. The process of claim 3, wherein the volume fraction of polymer chain tail to cage-like molecular nanoparticle head is selected such that nanostructure of said step of annealing a body center cubic packed spheres micellar morphology.

* * * * *